United States Patent [19]

Lange

[11] Patent Number: 4,948,232

[45] Date of Patent: Aug. 14, 1990

[54] DEVICE FOR THE PRESENTATION OF INFORMATION WITH ROLLABLE PLASTIC SUBSTRATE

[76] Inventor: Alf Lange, Kurvn. 5, N-0495 Oslo 4, Norway

[21] Appl. No.: 378,476

[22] PCT Filed: Dec. 13, 1984

[86] PCT No.: PCT/NO84/00058

§ 371 Date: Aug. 13, 1985

§ 102(e) Date: Aug. 13, 1985

[87] PCT Pub. No.: WO85/02703

PCT Pub. Date: Jun. 20, 1985

Related U.S. Application Data

[63] Continuation of Ser. No. 770,876, Aug. 13, 1985.

[30] Foreign Application Priority Data

Dec. 16, 1983 [NO] Norway ................................ 834642

[51] Int. Cl.[5] ........................ G02F 1/133; G09G 3/18; G09G 3/36

[52] U.S. Cl. .................................... 350/334; 350/336; 350/339 R; 340/765; 340/784

[58] Field of Search .................... 350/334, 339 R, 336, 350/344; 340/785, 784, 765, 804

[56] References Cited

U.S. PATENT DOCUMENTS

| | | | |
|---|---|---|---|
| 4,013,344 | 3/1977 | Bescond . | |
| 4,295,712 | 10/1981 | Ishiwatari | 350/344 |
| 4,342,031 | 7/1982 | Lapeyre | 340/765 X |
| 4,455,185 | 6/1984 | Sasaki et al. | 350/339 R X |
| 4,474,432 | 10/1984 | Takamatsu et al. | 350/339 R |
| 4,501,471 | 2/1985 | Culley et al. | 350/339 R X |
| 4,616,903 | 10/1986 | Fergason | 350/347 V X |

FOREIGN PATENT DOCUMENTS

| | | |
|---|---|---|
| 12149 | 10/1984 | European Pat. Off. . |
| 3040551 | 5/1981 | Fed. Rep. of Germany . |
| 2458857 | 1/1981 | France . |

OTHER PUBLICATIONS

Aviram, A., "Packaging of Liquid Crystal Displays," *IBM Technical Disclosure Bulletin,* vol. 15, No. 2, (Jul. 1972) pp. 580–581.

*Primary Examiner*—Stanley D. Miller
*Assistant Examiner*—Anita Pellman Gross
*Attorney, Agent, or Firm*—Hubbard, Thurman, Turner, Tucker & Harris

[57] ABSTRACT

An information liquid crystal display device includes rows of liquid crystal elements for forming alpha-numeric characters. A single, lightweight, flexible, light transparent, plastic sheet supports the liquid crystal elements in an arrangement enabling roll up of the support for transport to a display window, for example, for attachment. No contrast-forming foil is included as a second support. The plastic support has contact formed on an edge thereof for connecting the liquid crystal elements to a microprocessor having a keyboard for inputting information for display for selected liquid crystal elements.

3 Claims, 2 Drawing Sheets

6

DEVICE FOR THE PRESENTATION OF INFORMATION WITH ROLLABLE PLASTIC SUBSTRATE

This application is a continuation, of application Ser. No. 770,876, filed Aug. 13, 1985.

The present invention relates to a device for the presentation of information, especially alpha-numeric characters, comprising a display means which is constructed from a plurality of character-forming liquid crystal elements and is arranged to be activated by an electronic means.

BACKGROUND OF THE INVENTION

Display devices which are based on the use of so-called liquid crystals, during the recent years have found their application in many different fields. As examples there may be mentioned digital watches, different types of measuring instruments, and electronic applications in the provision of informative messages in the form of e.g. combinations of figures and letters. Such display devices of the liquid crystal display (LCD) type contain a number of liquid crystal cells or elements which are usually segment-oriented so as to form the actual characters, e.g. 7-segment or 16-segment alpha-numeric characters. As known, the liquid crystals are molecules which are capable of electric polarization, and a liquid crystal element is activated by the application of a suitable DC voltage, e.g. 5 volts, so that the liquid is polarized and changes from being transparent to a dark grey tone. When placing a polarization filter over a liquid crystal element at right angles to the polarization direction, a much darker tone appears when the element is activated, so that better contrast is achieved.

In the previously known liquid crystal displays one has, in accordance with the conventional technique, considered it to be necessary to use a non-transparent contrast foil at the rear side of the LCD unit in order to improve the contrast between the displayed characters and the surroundings. The contrast foil causes the LCD unit to be non-transparent also in the non-activated condition, and this represents a limitation in the possible applications. Thus, the contrast foil delimits the use to the display of "two-dimensional" information, i.e. information which is present in a plane such as is the case in the above-mentioned fields of application.

A device of the introductorily stated type is known from DE publication print No. 3 120 601. This known device is intended for use in "observation devices", vehicles and the like, and comprises a liquid crystal display plate which, in use, can be placed in a viewer's field of view or is arranged in the marginal region thereof in such a manner that it does not interrupt the visual observation in the viewer's field of view. The display plate consists of a pair of parallel glass plates with a liquid crystal mixture and electrodes placed therebetween, and behind the display plate there is placed a means for illuminating the plate in dim light and in darkness. Further, the plate is also preferably covered by a partly reflecting foil to increase the contrast. Thus, the device is a quite visible unit also in non-activated condition, even if it is designed with a view not to disturb the visual observation in a viewer's field of view.

SUMMARY OF THE INVENTION

The object of the present invention is to provide a device extending the use of liquid crystal elements for the display of information in such a manner that the display device, when being placed on a transparent surface, such as a display window or the like, is invisible in non-activated condition, and wherein desired information can be displayed instantaneously by means of a possibly programmable control means.

The above object is achieved with a device of the introductorily stated type which, according to the invention, is characterized in that the liquid crystal elements are disposed on a transparent support plate and are mounted on the plate in such a design that the plate with characters mounted thereon is approximately 100% transparent in non-activated condition of the elements, and that the elements are connected to a contact means which, at an edge portion of the support plate, is fitted for connection to the electronic means, this being arranged, in a manner known per se, for selectively controllable activation of the liquid crystal elements.

The device according to the invention affords the possibility of displaying different information in e.g. shop windows wherein the potential information is then placed on the windows "all the time", but is invisible until the actual characters and/or symbols are activated and the information is clearly presented. The invisibility is a result of the fact that the liquid crystal elements are without the aforementioned contrast foil or the like, or other component parts reducing or destroying the transparency. The information in question can be activated in a moment, and it can be changed unlimitedly by means of programmable instructions, the device being controllable locally or centrally by e.g. a microprocessor through a suitable interface unit. Thus, the device may replace window posters which are now used in shops or the like, and which prevent the view into and out of the windows.

BRIEF DESCRIPTION OF THE DRAWING FIGURES

The invention will be further described below in connection with an exemplary embodiment with reference to the accompanying drawings, wherein FIG. 1 shows a front view of a device for the presentation of information in accordance with the invention;

BRIEF DESCRIPTION OF THE PREFERRED EMBODIMENTS

Figure 1:
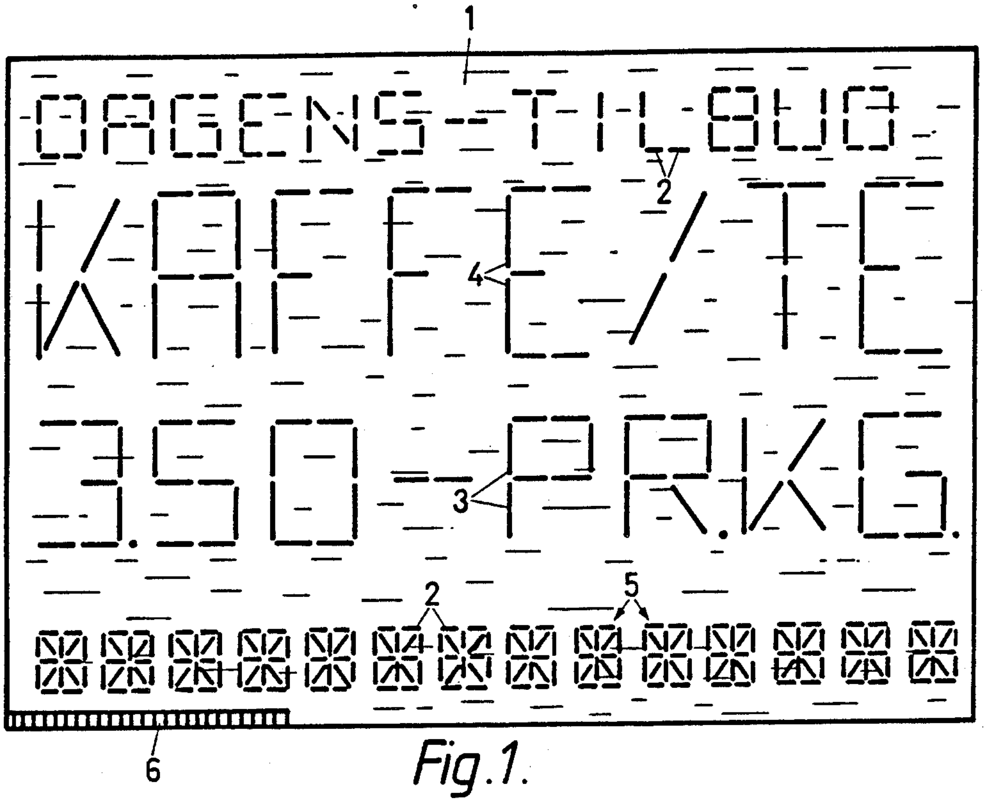

The display device shown in FIG. 1 comprises a fully transparent support plate 1 on which there is mounted a plurality of liquid crystal elements which are segment-oriented in groups of 16 so that the elements in a conventional manner form 16-segment alpha-numeric characters. In the illustrated example there are arranged four horizontal character rows wherein the liquid crystal elements, e.g. 2, 3, 4, in the various rows have different sizes for the formation of characters of a corresponding size.

Figure 2:
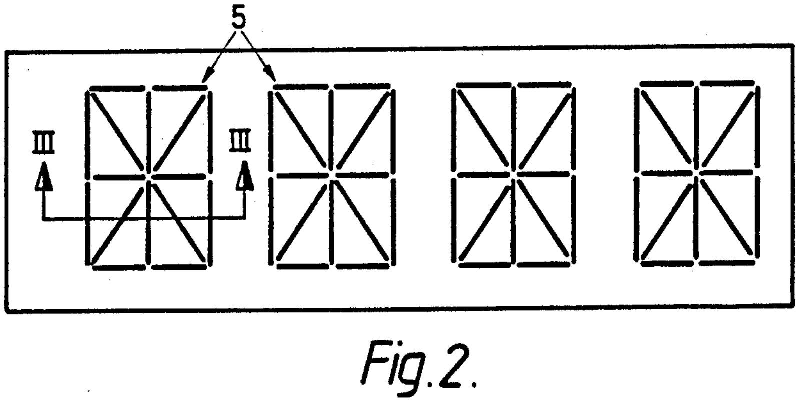
FIG. 2 shows an enlarged view of four characters of the type used in the device in FIG. 1.

In FIG. 2 four such 16-segment characters 5 are shown on an enlarged scale. By selective activation of the liquid crystal segment in such a character, one can produce whichever of the international typewriter characters according to the so-called ASCII-code. The 16-segment alpha-numeric characters shown in FIGS. 1 and 2 are only to be regarded as an example, as other types of characters can be used, dependent on the actual requirement, e.g. 7-segment characters, 5×7 dot matrix characters or other characters or symbols which can be formed by means of liquid crystal elements.

By means of extremely thin lead connections the individual liquid crystal elements are connected to a contact means which is designated 6 in FIG. 1 and is arranged at an edge portion of the support plate 1, so that the display device is fitted for connection to an electronic activation means through a suitable interface unit, such as further described in connection with FIG. 4. The lead connections are so thin that in practice they will not be seen and therefore will not interfere with the transparency of the support plate. In other respects the wiring arrangement will be known to a person skilled in the art, so that a closer description thereof is not necessary.

Figure 3:
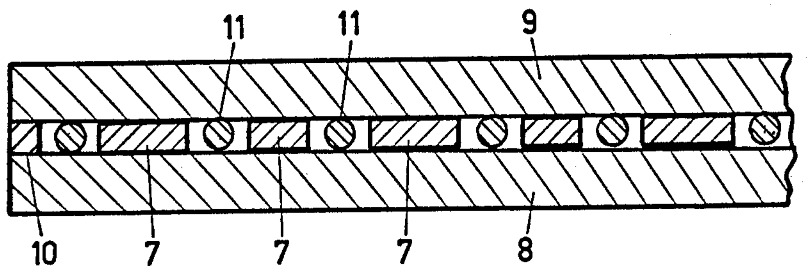
FIG. 3 shows an enlarged cross-section along the line III—III in FIG. 2.

In FIG. 3 there is shown a section through a representative LCD character 5 along the line III—III in FIG. 2. The Figure shows five liquid crystal segments 7 which are hermetically enclosed between a pair of parallel glass plates 8 and 9, a suitable seal 10 forming a hermetical seal between the glass plates 8, 9 along the edges thereof. In the open spaces between the segments 7 there are inserted distance particles 11, e.g. of a suitable plastic material, for maintaining a constant distance between the glass plates.

In principle, the LCD characters are mounted on the support plate 1 in the design shown in FIG. 3, i.e. without any non-transparent contrast foil being placed on the back side of the liquid crystal elements, such as is done according to the prior art. This design or embodiment implies that the support plate with liquid crystal elements mounted thereon is approximately 100% transparent in both viewing directions in the non-activated condition of the elements.

The rows of LCD characters can be placed on and attached in a suitable manner to one side face of the support plate 1, or they can be inserted into the support plate, e.g. in that the latter consists of a pair of layers placed against each other. The support plate may advantageously consist of a thin, flexible plastic material in sheet form of a suitable size. An advantageous embodiment with respect to storage and transport is achieved when the liquid crystal elements are mounted on the support plate in an arrangement enabling rolling-up of the plate. The liquid crystal elements may also be mounted on the support plate in an arrangement enabling modular construction of the plate.

Figure 4:
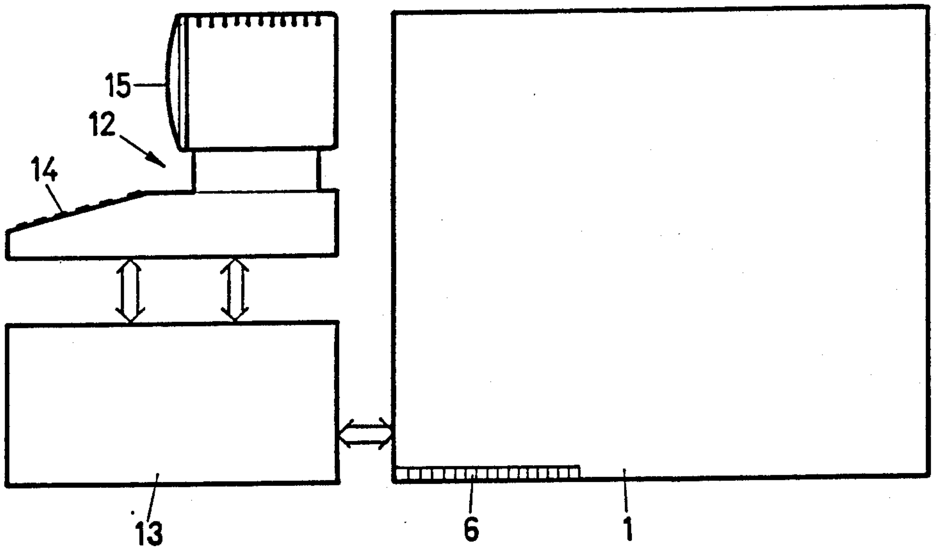
FIG. 4 shows the device in FIG. 1 connected to a computer- controlled activation unit.

In FIG. 4 there is schematically shown an arrangement wherein the display device shown in FIG. 1 is connected to an electronic activation means 12 by way of an interface unit 13. The electronic means 12 may consist of a programmable computer, e.g. a microprocessor, which, as shown in FIG. 4, comprises a keyboard 14 for writing and entering of the desired text, and a screen 15 for simultaneous display of the written text which is to be displayed by means of the device according to the invention. The units 12 and 13 may be of a conventional design, and the interface unit may e.g. be of the type RS 232, the contact means 6 then being correspondingly adapted.

The activation means may be placed locally, or also in a central location with the possibility of simultaneous control and activation of several display devices of the described type. Thus, there is provided a very flexible arrangement enabling immediate display of desired information, and also the possibility of rapid alteration or variation of the information. There may also be provided a means for intermittent activation of the display device, with a view to enabling the displayed information to attract greater attention.

I claim:

1. A display device for the presentation of information in alpha-numeric form, comprising:

a support plate including two opposing flexible sheets of rollable transparent plastic material, and a contact means mounted adjacent to an edge of one of the support plate sheets;

a plurality of individual liquid crystal elements mounted between the flexible sheets of the support plate with leads connected to the contact means, the liquid crystal elements being mounted in an arrangement enabling rolling-up of the support plate into a roll, whereby said roll may be transported to a store window pane or the like, unrolled and attached to the window pane for displaying information through the window without substantially inhibiting interior or exterior viewing; and a means connected to the contact means of the support plate for selective actuation of the liquid crystal elements for forming an information display.

2. A device according to claim 1 wherein the support plate is constructed in modular form.

3. Information display apparatus, comprising:

a plurality of liquid crystal display elements, each element having a first de-energized, essentially transparent and invisible state for visual observation therethrough, and a second energized, visible state in response to an energizing signal for forming a visible alpha-numeric character portion while allowing visual observation therethrough around said alpha-numeric portion;

a flexible, thin sheet of transparent flexible plastic for supporting said liquid crystal display elements permanently, said support means having a rolled storage and transport orientation, and, an unrolled operating orientation, said liquid crystal display elements being arranged on said support means to display desired information formed by said alpha-numeric characters;

essentially invisible flexible conducting means extending along said transparent support means and rollable therewith between said storage and operating orientations, said conducting means individually connecting with said liquid display elements so that each element can be selectively de-energized and energized to form a specific alpha-numeric character; and, port means connected to said conducting means for the input of specific energizing signals for selective, controllable activation of each liquid crystal display element.

* * * * *